June 23, 1970   J. F. BUTLER   3,516,500
TRAILING PLOUGHS
Filed June 1, 1967   2 Sheets-Sheet 1
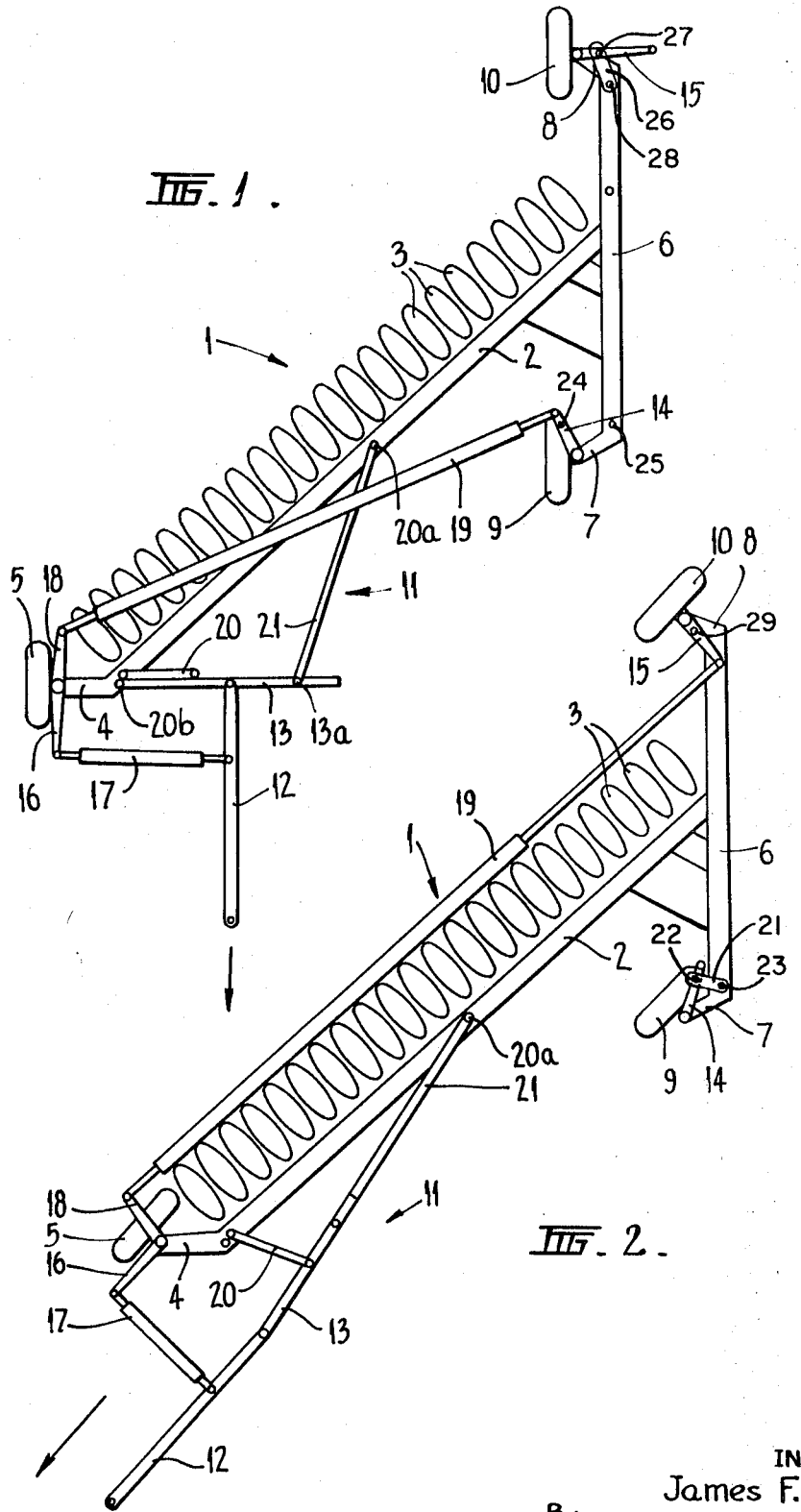
INVENTOR
James F. Butler
By  JKmcneill
ATT'Y United States Patent Office 3,516,500
Patented June 23, 1970

3,516,500
TRAILING PLOUGHS
James F. Butler, Blemont, Geelong, Australia, assignor to International Harvester Company, Chicago, Ill., a corporation of Delaware
Filed June 1, 1967, Ser. No. 642,842
Int. Cl. A01b 69/00
U.S. Cl. 172—282    5 Claims

ABSTRACT OF THE DISCLOSURE

A trailing disk plough is provided with front and rear furrow wheels and a land wheel, and in the transport position steering linkage connecting the furrow wheels is also operatively connected to the draft means to transmit steering motion of the propelling vehicle to the furrow wheels. Turning of the plough is facilitated by arranging the wheels in such a way that the locus of intersection of the axes of the furrow wheels during turning of the plow lies on a line through the axis of the land wheel.

---

Figure 3:
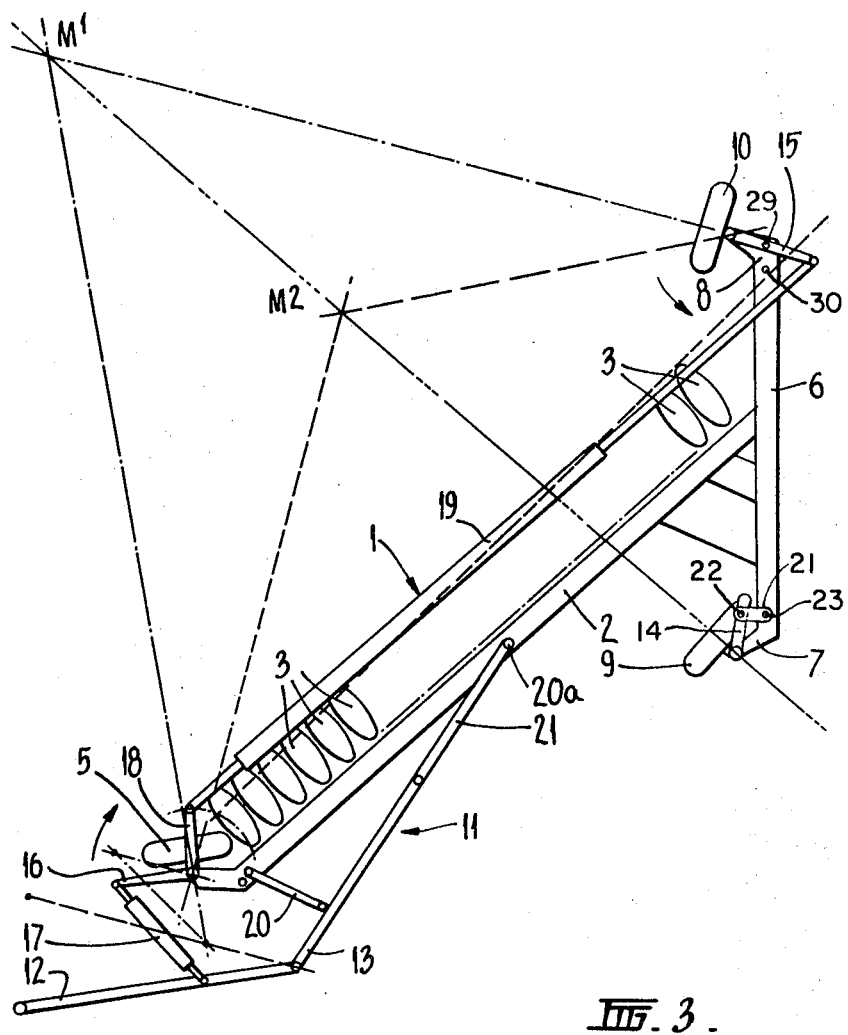

This invention relates to trailing ploughs of the type having a main beam carrying earth working tools supported at one end by a front furrow wheel and at the other end by a side beam inclined to and projecting fore and aft of the main beam, said side beam being supported by a foreward land wheel and a rear furrow wheel.

It is the normal practice with trailing ploughs to provide means whereby the plough can be coupled to the towing vehicle so that its normal overall width in the direction transverse to the direction of travel is reduced for convenience during transport. It is also desirable to provide a steering arrangement whereby the plough can be readily steered while in both the working and transport positions, and that during transport, the turning circle of the plough is at least as small as the turning circle of the towing vehicle. This steering arrangement is desirable in order to reduce scuffing of the tires and to permit convenient maneuvering of the plough. Various steering arrangements are at present in use, but these do not provide the ideal steering characteristics necessary to eliminate scuffing of the tires and to provide a small turning circle when in the transport position.

It is, therefore, the principal object of the present invention to provide a trailing plough of the type herein specified which has the desired steering characteristics and does not possess the disadvantages of the known steering mechanisms.

With the above stated principal object in view, there is provided according to the present invention a trailing plough of the type herein specified wherein the front and rear furrow wheels and the land wheel are each mounted for pivotal steering movement about respective vertical axes, and there are provided draft means connected to the main beam and adapted for coupling to a towing vehicle when the main beam is in a working or transport position in which it presents wide and narrow aspects respectively to the direction of travel, steering linkage operable by the draft means and selectively connectable to effect steering of the front furrow and land wheels or the front and rear furrow wheels in the working and transport positions respectively of the main beam, and means to lock the land wheel and rear furrow wheel independently against pivotal steering movement and with their respective axes at right angles to the direction of travel when not connected to the steering linkage.

The steering linkage is designed such that, when the main beam is in the transport position, the front and rear furrow wheels are turned during steering in opposite directions about their respective pivot axes by amounts so that the locus of the intersection of their axes during turning lies on the axis of the fixed land wheel.

A practical arrangement will now be described with reference to the accompanying drawings in which:
FIG. 1 is a plan of a plough with the linkage in the plough configuration.
FIG. 2 is a plan of the plough with the linkage in the transport configuration; and
FIG. 3 is a plan of the plough with the linkage in the transport configuration, and indicates the geometry of the linkage when the plough is turning to the right.

In the drawings, a plough generally indicated at 1 comprises a conventional main beam 2 supporting a plurality of plough discs 3 mounted for rotation about a common axis parallel to the main beam, the mounting including a suitable stump jump mechanism (not shown).

The forward end 4 of the main beam is cranked in a direction towards the axes of the discs and carries at its extremity a front furrow wheel 5 mounted for angular movement relative to the main beam about a vertical axis by a conventional stub axle assembly.

The rear end of the main beam is rigidly connected to a side beam 6 which is inclined to and extends forwardly and rearwardly of the main beam. The side beam has respective forwardly and rearwardly inclined sections 7, 8, at the respective ends of which are a forward land wheel 9 and a rear furrow wheel 10, mounted for relative angular movement about respective vertical axes by means of conventional stub axle assemblies.

A draft linkage generally indicated at 11 is connected to the main beam and includes a draft bar 12 pivoted to one end to a member 13 of the linkage and adapted at the other end for coupling to the tractor draw bar (not shown). The draft linkage is arranged so that it may be set in either the working or transport configurations (FIG. 1, FIG. 2 and FIG. 3) in the former of which the side beam is substantially parallel to the direction of travel and in the latter, the main beam is approximately parallel to the direction of travel.

In the working configuration, the members 13 and 21 are pivoted to each other at 13a and to the main beam at 20a and 21a respectively. In this configuration, the members 13 and 20 are pinned together to form a rigid link. In order to change to the transport configuration, the member 13 is released to pivot at 20b relative to member 20 to bring members 13 and 21 into alignment, in which position they are locked. Draft bar 12 is then connected to the forward end of member 13 at 1.

The land wheel and rear furrow wheel are each provided with a steering arm 14, 15 having a fixed relation to the axis of the wheel and are provided with any suitable means whereby the respective wheels may be locked relative to the side beam. For steering arm 14 such locking means is indicated in FIGS. 2 and 3 as a link 21 having pins 22 and 23 at its ends respectively receivable in openings 24 and 25 in arm 14 and beam 6. Similarly, for arm 15 a link 26 shown in FIG. 1 has pins 27 and 28 receivable in openings 29 and 30 in arm 15 and beam 6, respectively. The front furrow wheel is provided with two steering arms, one of which 16 is fixed relative to the axis of the wheel so as to project forwardly therefrom and is coupled by a drag link 17 to the draft bar 12. The other steering arm 18 on the furrow wheel is adjustable so that it may be locked in a position in substantially the same vertical plane as the fixed steering arm 16 (FIG. 1) or in a position substantially at right angles thereto (FIGS. 2 and 3).

An adjustable length tie rod 19 is provided to selectively couple the adjustable steering arm 18 of the front furrow wheel to the steering arm of the land wheel (FIG. 1) or the rear furrow wheel respectively (FIGS. 2 and 3).

When the plough is in the working position (FIG. 1), the rear furrow wheel is locked to the side beam so that the axis of the rear furrow wheel is at right angles to the desired direction of travel of the plough. The two steering arms 16 and 18 on the front furrow wheel are locked in the same vertical plane and the tie rod connects the adjustable steering arm 18 of the front furrow wheel with the steering arm 14 of the land wheel, both of which extend in a generally rearwardly direction from the pivot axes of the respective wheels. The members 13 and 21 are configured as indicated, with member 20 inoperative.

Thus, during operation of the plough, the front furrow and land wheels are steered in response to the movement of the draft bar relative to the main frame during turning of the towing vehicle.

When it is desired to transport the plough, the steering arm 15 of the rear furrow wheel is unlocked and the adjustable steering arm 18 on the front furrow wheel relocated in a position substantially at right angles to the fixed steering arm 16 and extending in a direction opposite to the drag link 17 (FIGS. 2 and 3). The tie rod is then extended and coupled between the adjustable steering arm 18 of the front furrow wheel and the steering arm 15 of the rear furrow wheel, while the steering arm of the land wheel is locked relative to the side beam so that the axis of the land wheel is approximately at right angles to the main beam. The members 13 and 21 are fixed in alignment as shown, and the member 20 brought into operation as indicated.

Thus, during transport, the front and rear furrow wheels are rotated in opposite directions during turning of the plough and the proportions of the various links of the steering mechanism are designed so that, during such turning, the locus of the intersection of the axes of the furrow wheels as shown in two positions at $M_1$ and $M_2$, moves along the axis of the land wheel (FIG. 3). This steering arrangement provides the minimum turning circle for the plough during transport and eliminates scuffing of the tires.

In the above described construction, the tie rod 19 is required to be capable of considerable variation in length to operate in both the working and transport configurations. In an alternative construction, a tie rod of fixed length is connected to one arm of a bell crank mounted at or near the junction of the main and side beams. The other arm of the bell crank may be selectively coupled to the steering arm of the land wheel or rear furrow wheel by a second fixed length tie rod.

I claim:

1. A trailing plough of the type herein specified, having a main beam upon which is mounted a front furrow wheel and a side beam upon which a rear furrow wheel and a land wheel are mounted, said wheels being mounted on their respective beams for pivotal steering movement about respective vertical axes, draft means being provided and connected to the main beam and adapted for coupling to a towing vehicle when the main beam is in a working or transport position in which it presents wide and narrow aspects respectively to the direction of travel, steering linkage operatively connected to the draft means and selectively connectable to effect steering of the front furrow and land wheels or the front and rear furrow wheels in the working and transport position respectively of the main beam, and means to lock the land wheel and rear furrow wheel to the side beam independently against pivotal steering movement and with their respective axes at right angles to the direction of travel when not connected to the steering linkage.

2. A trailing plough as claimed in claim 1, wherein the steering linkage when in the transport configuration turns the front and rear furrow wheels during steering in opposite directions about their respective pivot axes by amounts so that the locus of the intersection of their axes during turning lies on the axis of the fixed land wheel.

3. A trailing plough as claimed in claim 1, wherein the steering linkage includes at least one steering arm on each wheel, and the linkage is provided to selectively connect the steering arms as required for the working and transport configurations.

4. A trailing plough of the type herein specified, having a main beam upon which is mounted a front furrow wheel and a side beam upon which a rear furrow wheel and a land wheel are mounted, said wheels being mounted on their respective beams for pivotal steering movement about respective vertical axes, a steering arm connected to each wheel, draft means being provided and connected to the main beam and adapted for coupling to a towing vehicle when the main beam is in a working or transport position in which it presents wide and narrow aspects respectively to the direction of travel, steering linkage operatively connected to the draft means and selectively connectable to said steering arms to effect steering of the front furrow and land wheels or the front and rear furrow wheels in the working and transport position respectively of the main beam, and means to lock the land wheel and rear furrow wheel to the side beam independently against pivotal steering movement and with their respective axes at right angles to the direction of travel when not connected to the steering linkage, the steering linkage when in the transport configuration turning the front and rear furrow wheels during steering in opposite directions about their respective pivot axes by amounts so that the locus of the intersection of their axes during turning lies on the axis of the fixed land wheel.

5. A trailing plough of the type herein specified comprising, supporting beam means upon which are mounted front and rear furrow wheels and a land wheel, draft means connected to said beam means and connectable to a towing vehicle when the plough is in working or transport position in which the plough presents wide and narrow aspects respectively to the direction of travel, steering linkage connected between said front and rear furrow wheels and to said draft means to transmit steering movement of the towing vehicle to said furrow wheels in one of said positions, said steering linkage being adapted to turn said front and rear furrow wheels in opposite directions in response to the steering of the towing vehicle, the arrangement of the front and rear furrow wheels and the land wheel being such that the locus of the intersection of the axes of said furrow wheels during turning lies on a line through the axis of said land wheel.

References Cited

UNITED STATES PATENTS

| | | | |
|---|---|---|---|
| 1,823,508 | 9/1931 | Paul | 172—285 X |
| 2,065,015 | 12/1936 | Nielsen | 172—288 |
| 2,950,927 | 8/1960 | Hendrickson | 172—284 X |
| 2,982,363 | 5/1961 | Sweet et al. | 172—288 X |

ROBERT E. PULFREY, Primary Examiner

R. C. HARRINGTON, Assistance Examiner

U.S. Cl. X.R.

172—285, 288